(12) United States Patent
Liao et al.

(10) Patent No.: US 10,461,364 B2
(45) Date of Patent: Oct. 29, 2019

(54) ELECTROLYTE ADDITIVES FOR LITHIUM-ION BATTERIES UNDER HIGH-VOLTAGE OPERATION

(71) Applicant: UCHICAGO ARGONNE, LLC, Chicago, IL (US)

(72) Inventors: Chen Liao, Westmont, IL (US); Cameron Peebles, Oak Park, IL (US); Daniel Abraham, Bolingbrook, IL (US); Zhengcheng Zhang, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 250 days.

(21) Appl. No.: 15/492,260

(22) Filed: Apr. 20, 2017

(65) Prior Publication Data

US 2018/0309168 A1 Oct. 25, 2018

(51) Int. Cl.
*H01M 10/052* (2010.01)
*H01M 10/0567* (2010.01)
*H01M 10/0525* (2010.01)

(52) U.S. Cl.
CPC .... *H01M 10/0567* (2013.01); *H01M 10/0525* (2013.01); *H01M 2300/0025* (2013.01)

(58) Field of Classification Search
CPC ............... H01M 10/0567; H01M 10/0525
See application file for complete search history.

(56) References Cited

U.S. PATENT DOCUMENTS 9,300,009 B2  3/2016  Sun et al.
9,478,828 B2  10/2016  Yokotsuji et al.
(Continued)

FOREIGN PATENT DOCUMENTS

EP   3054521 A1   8/2016
JP   2015-72865   4/2015

OTHER PUBLICATIONS

Sun et al., New promising lithium malonatoborate salts for high voltage lithium ion batteries, Sep. 2016, J. Mater.Chem. A, 2017, 1233 (Year: 2016).*

(Continued)

*Primary Examiner* — Helen Oi K Conley
(74) *Attorney, Agent, or Firm* — Olson & Cepuritis, Ltd.

(57) ABSTRACT

A non-aqueous electrolyte for a lithium-ion battery comprises a lithium salt and an additive in an organic solvent. The additive comprises a di-substituted malonate silyl ester compound, in which the hydrogens of the malonate methylene group are replaced by substituents $R^1$ (e.g., alkyl) and X (e.g., halogen). Each of the carboxylic acid groups of the malonate are esterified by a monovalent silyl group such as $—Si(R^4)_3$; or the two carboxylic acid groups are esterified by a single divalent silylene group such as $—Si(R^5)_2—$ to form a ring therewith. Each $R^4$ and $R^5$ independently is alkyl, phenyl, or alkoxy; and each substituted-alkyl comprises an alkyl moiety substituted with one or more group selected from alkenyl, alkynyl, hydroxy, halogen, alkoxy, carboxylic acid, carboxylic ester, carboxylic amide, phenyl, sulfonic acid, and phosphonic acid.

22 Claims, 2 Drawing Sheets

(56) References Cited

U.S. PATENT DOCUMENTS

2014/0113202 A1    4/2014  Sun et al.
2015/0295244 A1  10/2015  Otsuka et al.

OTHER PUBLICATIONS

Wan et al., A stable fluorinated and alkylated lithium malonatoborate salt for lithium ion battery application, Apr. 2015, Chem. Communications 51, 9817 (Year: 2015).*

Bak, S-M et al., Structural Changes and Thermal Stability of Charged $LiNi_xMn_yCo_2O_2$ Cathode Materials Studied by Combined In Situ Time-Resolved XRD and Mass Spectroscopy, ACS Applied Materials & Interfaces 6, 22594-22601 (2014).

Han, Young-Kyu et al., Why Is Tris(trimethylsilyl) Phosphite Effective as an Additive for High-Voltage Lithium-Ion Batteries? Journal of Materials Chemistry A, 3, 10900-10909 (2015).

Ma, Lin et al., Improving the High Voltage Cycling of $Li[Ni0.42Mn0.42Co0.42Co0.16]O_2$ (NMC442)/Graphite Pouch Cells Using Electrolyte Additives, Journal of the Electrochemical Society, 161 (14) A2250-A2254 (2014).

\* cited by examiner

ELECTROLYTE ADDITIVES FOR LITHIUM-ION BATTERIES UNDER HIGH-VOLTAGE OPERATION

STATEMENT OF GOVERNMENT INTEREST

The United States Government has rights in this invention pursuant to Contract No. DE-AC02-06CH11357 between the United States Government and UChicago Argonne, LLC representing Argonne National Laboratory.

FIELD OF THE INVENTION

This invention relates to electrolyte additive materials for use in electrochemical cells and batteries. More particularly, this invention relates to electrolyte additive materials for lithium ion batteries operated under high-voltage operating conditions.

BACKGROUND

The electrolyte is a critical component in lithium-ion batteries (LIBs) and must evolve with the changing landscape of cathode materials. For example, the next generation of cathode materials will require high-voltage operating conditions (4.5 V or greater vs. Li/Li$^+$) in order to supply high capacity and high power demands. Nickel-rich layered oxide materials, such as $LiNi_xMn_yCo_zO_2$ (where x+y+z=1) (NMC), have shown tremendous promise as high energy density cathode materials and operate at voltages up to about 4.5 V vs. Li/Li$^+$ (about 4.4 V is a NMC/graphite full cell); however, these materials suffer from electrolyte oxidation and transition metal dissolution when cycled repeatedly at this operating voltage. One approach to dealing with the high-voltage shortcomings of nickel-rich layered oxide materials is the inclusion of electrolyte additives to mitigate detrimental effects observed at high operating voltages. This is particularly the case in the evolving landscape of batteries for electric vehicles.

Electrolyte additives can be classified into several groups depending upon their function in the cell: negative electrode additives, positive electrode additives, hydrofluoric acid (HF) scavengers, over-charge protection ("shuttle") additives, and the like. Additives that can employ two or more of these attributes are referred to as "multifunctional" and are uncommon. Commonly used additives such as vinylene carbonate (VC) and lithium bis(oxalate)borate (LiBOB) provide a more robust solid-electrolyte interphase (SEI) on both the negative and positive electrodes. However, due to the resistive nature of these surface films, the impedance of the cell can be significantly increased. Additives such as tris(trimethylsilyl)phosphite (TMSPi) are capable of reacting with HF in the electrolyte, but have limited ability to be functionalized.

There is an ongoing need for multifunctional additive materials for lithium-ion batteries that will be operated under relatively high-voltage conditions (i.e., greater than or equal to 4.5 V versus Li/Li, or greater than or equal to 4.4 V in a NMC/graphite full cell). The additive materials described herein address this need.

SUMMARY

Malonic silyl ester electrolyte additives for lithium-ion batteries are described herein. A non-aqueous electrolyte for a lithium-ion battery comprises a lithium salt and an additive in an organic solvent. The additive comprises a di-substituted malonate silyl ester compound, in which the hydrogens of the malonate methylene group are replaced by substituents R$^1$ and X. R$^1$ is alkyl or substituted-alkyl; and X is selected from halogen, alkoxy, cyano, sulfonyl (i.e., —SO$_2$R; R is alkyl, phenyl, substituted-alkyl, or substituted phenyl), sulfonylamido (i.e., —SO$_2$NR'$_2$; R' is H, alkyl, phenyl, substituted-alkyl, or substituted phenyl), carboxylic acid, carboxylic ester (i.e., —CO$_2$R; R is alkyl, phenyl, substituted-alkyl, or substituted phenyl), and carboxylic amide (i.e., —C(=O)NR'$_2$; R' is H, alkyl, phenyl, substituted-alkyl, or substituted phenyl). Each of the carboxylic acid groups of the malonate are esterified by a tri-substituted silyl group, —Si(R$^4$)$_3$; or the two carboxylic acid groups are esterified by a single divalent silylene group, —Si(R$^5$)$_2$—, to form a ring therewith. Each R$^4$ and R$^5$ independently is selected from alkyl, phenyl, and alkoxy; each substituted-alkyl comprises an alkyl moiety substituted with one or more substituent group selected from alkenyl, alkynyl, hydroxy, halogen, amino, alkoxy, carboxylic acid, carboxylic ester, carboxylic amide, phenyl, sulfonic acid, and phosphonic acid; and each substituted-phenyl comprises a phenyl moiety substituted with one or more substituent group selected from alkyl, alkenyl, alkynyl, hydroxy, halogen, alkoxy, carboxylic acid, carboxylic ester, carboxylic amide, phenyl, sulfonic acid, and phosphonic acid.

The design of the malonic silyl ester additive addresses two important issues with lithium-ion battery chemistries. The first issue is capacity loss (energy fade) in lithium-ion battery full cell chemistries, which is primarily caused by irreversible lithium loss in the solid electrolyte interphase (SEI) of the negative electrode (anode). The second issue is impedance rise (power fade), which is primarily related to changes at the positive electrode (cathode) due to, e.g., resistive surface films, oxide morphology changes, and the like, that form or occur during charging and discharging of the cell. The additives described herein provide a multifunctional approach to these issues. For example, the silyl ester groups can react with by-product HF formed during charge/discharge to suppress transition metal dissolution from the cathode electrode, while the core malonic ester moiety can form a stable surface film at the surface of the cathode electrode to prevent electrolyte oxidation.

Non-limiting examples of certain embodiments of the electrolytes and materials described herein include:

Embodiment 1, which is a non-aqueous electrolyte for a lithium-ion battery comprising a lithium salt and an additive in an organic solvent; wherein the additive comprises a compound of Formula (I):

(I)

wherein R$^1$ is selected from alkyl and substituted-alkyl; X is selected from halogen, alkoxy, cyano, sulfonyl, sulfonylamido, carboxylic acid, carboxylic ester, and carboxylic amide; R$^2$ and R$^3$ each independently is —Si(R$^4$)$_3$, or R$^2$ and R$^3$ together are —Si(R$^5$)$_2$—; each R$^4$ and R$^5$ independently is selected from alkyl, phenyl, and alkoxy; and each substituted-alkyl comprises an alkyl moiety substituted with one or more substituent group selected from alkenyl, alkynyl, hydroxy, halogen, amino, alkoxy, carboxylic acid, carboxylic ester, carboxylic amide, phenyl, sulfonic acid, and phosphonic acid.

Embodiment 2, which is the electrolyte of Embodiment 1, wherein the additive is present in the electrolyte at a concentration in the range of about 0.005 molar (M) to about 0.5 M.

Embodiment 3, which is the electrolyte of any one of Embodiments 1 to 2, wherein the lithium salt is present in the electrolyte at a concentration in the range of about 0.1 M to about 3 M.

Embodiment 4, which is the electrolyte of any one of Embodiments 1 to 3, wherein the lithium salt is selected from one or more of $LiF_2BC_2O_4$, $LiPF_6$, $LiBF_4$, $LiB(C_2O_4)_2$, $LiClO_4$, lithium bis(fluorosulfonyl)imide (LiFSI), lithium bis(trifluoromethanesulfonyl)imide (LiTFSi), and $LiAsF_6$.

Embodiment 5, which is the electrolyte of any one of Embodiments 1 to 4, wherein the solvent comprises one or more solvent selected from a linear dialkyl carbonate (e.g., dimethyl carbonate, diethyl carbonate, ethyl methyl carbonate), a cyclic alkylene carbonate (ethylene carbonate, propylene carbonate), a sulfolane, a sulfone, a fluoro-substituted linear dialkyl carbonate, a fluoro-substituted cyclic alkylene carbonate, a fluoro-substituted sulfolane, and a fluoro-substituted sulfone.

Embodiment 6, which is the electrolyte of any one of Embodiments 1 to 5, wherein X is F.

Embodiment 7, which is the electrolyte of any one of Embodiments 1 to 6, wherein $R^1$ is $C_1$ to $C_4$ alkyl (e.g., methyl, ethyl).

Embodiment 8, which is the electrolyte of any one of Embodiments 1 to 7, wherein each $R^4$ and $R^5$ independently is a $C_1$ to $C_4$ alkyl group (e.g., methyl, ethyl, t-butyl).

Embodiment 9, which is the electrolyte of Embodiment 1, wherein the additive is a compound of Formula (II):

(II)

wherein $R^1$ is selected from alkyl and substituted-alkyl; each substituted-alkyl comprises an alkyl moiety substituted with one or more substituent group selected from alkenyl, alkynyl, hydroxy, halogen, amino, alkoxy, carboxylic acid, carboxylic ester, carboxylic amide, phenyl, sulfonic acid, and phosphonic acid; X is selected from halogen, alkoxy, cyano, sulfonyl, sulfonylamido, carboxylic acid, carboxylic ester, and carboxylic amide; and each $R^4$ independently is selected from alkyl, phenyl, and alkoxy.

Embodiment 10, which is the electrolyte of Embodiment 9, wherein X is F.

Embodiment 11, which is the electrolyte of any one of Embodiments 9 to 10, wherein $R^1$ is selected from $C_1$ to $C_4$ alkyl (e.g., methyl, ethyl) and allyl.

Embodiment 12, which is the electrolyte of any one of Embodiments 9 to 11, wherein each $R^4$ independently is a $C_1$ to $C_4$ alkyl group (e.g., methyl, ethyl, t-butyl).

Embodiment 13, which is the electrolyte of any one of Embodiments 9 to 12, wherein X is F; and $R^1$ is selected from $C_1$ to $C_4$ alkyl (e.g., methyl, ethyl) and allyl.

Embodiment 14, which is the electrolyte of any one of Embodiments 9 to 13, wherein X is F; $R^1$ is selected from $C_1$ to $C_4$ alkyl (e.g., methyl, ethyl) and allyl; and each $R^4$ independently is a $C_1$ to $C_4$ alkyl group (e.g., methyl, ethyl, t-butyl).

Embodiment 15, which is the electrolyte of any one of Embodiments 9 to 14, wherein X is F; $R^1$ is selected from methyl and allyl; and each $R^4$ is methyl.

Embodiment 16, which is the electrolyte of Embodiment 1, wherein the additive is a compound of Formula (III):

(III)

wherein $R^1$ is selected from alkyl and substituted-alkyl; each substituted-alkyl comprises an alkyl moiety substituted with one or more substituent group selected from alkenyl, alkynyl, hydroxy, halogen, amino, alkoxy, carboxylic acid, carboxylic ester, carboxylic amide, phenyl, sulfonic acid, and phosphonic acid; X is selected from halogen, alkoxy, cyano, sulfonyl, sulfonylamido, carboxylic acid, carboxylic ester, and carboxylic amide; and each $R^5$ independently is selected from alkyl, phenyl, and alkoxy.

Embodiment 17, which is the electrolyte of Embodiment 16, wherein X is F.

Embodiment 18, which is the electrolyte of any one of Embodiments 16 to 17, wherein $R^1$ is selected from $C_1$ to $C_4$ alkyl (e.g., methyl, ethyl) and allyl.

Embodiment 19, which is the electrolyte of any one of Embodiments 16 to 18, wherein each $R^5$ independently is a $C_1$ to $C_4$ alkyl group (e.g., methyl, ethyl, t-butyl).

Embodiment 20, which is the electrolyte of any one of Embodiments 16 to 19, wherein X is F; and $R^1$ is selected from methyl and allyl.

Embodiment 21, which is a lithium-ion electrochemical cell comprising a cathode and an anode, with porous separator therebetween, and an electrolyte of any one of embodiments 1-20 contacting the anode, cathode and separator.

Embodiment 22, which is a lithium-ion battery comprising a plurality of electrochemical cells of Embodiment 21 electrically connected in series, parallel, or both series and parallel.

BRIEF DESCRIPTION OF THE DRAWINGS

The invention consists of certain novel features and a combination of parts hereinafter fully described, illustrated in the accompanying drawings, it being understood that various changes in the details may be made without departing from the spirit, or sacrificing any of the advantages of the present invention.

DETAILED DESCRIPTION OF SELECTED EMBODIMENTS

Described herein are non-aqueous electrolytes for a lithium-ion batteries comprising a lithium salt and a 2,2-disubstituted malonate silyl ester additive in an organic solvent. The additives are generically described by Formula (I):

in which the $R^1$, $R^2$, $R^3$, and X groups are described in more detail below.

In Formula (I), $R^1$ is selected from alkyl and substituted-alkyl. In some embodiments, $R^1$ is $C_1$ to $C_8$ alkyl, preferably a $C_1$ to $C_4$ alkyl, which can be linear or branched. Non-limiting examples of $R^1$ alkyl groups include, e.g., methyl, ethyl, propyl, isopropyl, butyl, and the like. In some embodiments, $R^1$ is a substituted alkyl, such as a substituted $C_1$ to $C_8$ alkyl, a substituted a $C_1$ to $C_4$ alkyl, and the like, which can be linear or branched, and which includes at least one substituent group selected from alkenyl, alkynyl, hydroxy, halogen, amino (e.g., $NH_2$, alkylamino, dialkylamino), alkoxy (e.g., $C_1$ to $C_8$ alkoxy, preferably $C_1$ to $C_4$ alkoxy, which can be linear or branched), carboxylic acid (i.e., $-CO_2H$), carboxylic ester (e.g., $-CO_2R$, where R is alkyl or substituted alkyl, as described herein for R'), carboxylic amide (e.g., $-CONH_2$, $-CONH(R)_2$, $-CON(R)_2$, where R is alkyl or substituted alkyl (e.g., 2-hydroxyethyl, 2-hydroxypropyl, allyl, benzyl, and the like), as described herein for R'), phenyl, sulfonic acid ($-SO_3H$), and phosphonic acid (i.e., $-PO_4H_2$). Non-limiting examples of $R^1$ alkyl groups include, e.g., methyl, ethyl, propyl, isopropyl, butyl, and the like. A preferred alkenyl-substituted alkyl group is allyl ($-CH_2CH=CH_2$).

As used herein, the terms carboxylic acid, sulfonic acid, and phosphonic acid are meant to encompass both acid forms and salt forms thereof (e.g., ammonium ion and metal ion (e.g., alkali metal ion) salts). Similarly, as used herein, the term "amino" refers to primary, secondary and tertiary amino groups and compasses basic and salt forms (e.g., halide, sulfate, phosphate, etc.) of the amino groups.

In Formula (I), X is selected from halogen (e.g., F, Cl, Br, I), alkoxy (e.g., $C_1$ to $C_8$ alkoxy, preferably $C_1$ to $C_4$ alkoxy, in which the alkyl portion thereof can be linear or branched), cyano, sulfonyl (e.g., $-SO_2R$ in which R is alkyl (e.g., $C_1$ to $C_8$ alkyl, preferably $C_1$ to $C_4$ alkyl, such as methyl, ethyl, isopropyl and the like), phenyl, substituted-alkyl, or substituted phenyl), sulfonylamido (e.g., $-SO_2NR'_2$ in which R' is H, alkyl (e.g., $C_1$ to $C_8$ alkyl, preferably $C_1$ to $C_4$ alkyl such as methyl, ethyl, isopropyl, and the like), phenyl, substituted-alkyl, or substituted phenyl); carboxylic acid, carboxylic ester (e.g., $-CO_2R$ in which R is alkyl, phenyl, substituted-alkyl, or substituted phenyl), and carboxylic amide (e.g., $-C(=O)NR'_2$ in which R' is H, alkyl, phenyl, substituted-alkyl, or substituted phenyl). In other embodiments, X is selected from halogen and alkoxy (e.g., $C_1$ to $C_8$ alkoxy, preferably $C_1$ to $C_4$ alkoxy, which can be linear or branched). In some embodiments X is F. In other embodiments, X is methoxy, ethoxy or other $C_1$ to $C_4$ alkoxy groups.

In the substituents described above, substituted-alkyl groups are alkyl groups in in which a hydrogen thereof is replaced by another group, such as alkenyl, alkynyl, hydroxy, halogen, amino (e.g., $NH_2$, alkylamino, dialkylamino), alkoxy (e.g., $C_1$ to $C_8$ alkoxy, preferably $C_1$ to $C_4$ alkoxy, which can be linear or branched), carboxylic acid (i.e., $-CO_2H$), carboxylic ester (e.g., $-CO_2R$, where R is alkyl or substituted alkyl, as described herein for R'), carboxylic amide (e.g., $-CONH_2$, $-CONH(R)_2$, $-CON(R)_2$, where R is alkyl or substituted alkyl (e.g., 2-hydroxyethyl, 2-hydroxypropyl, allyl, benzyl, and the like), as described herein for R'), phenyl, sulfonic acid, and phosphonic acid. Similarly, substituted-phenyl groups are phenyl groups in in which a hydrogen thereof is replaced by another group, such as alkyl (e.g., $C_1$ to $C_8$ alkyl), alkenyl, alkynyl, hydroxy, halogen, amino (e.g., $NH_2$, alkylamino, dialkylamino), alkoxy (e.g., $C_1$ to $C_8$ alkoxy, preferably $C_1$ to $C_4$ alkoxy, which can be linear or branched), carboxylic acid, carboxylic ester (e.g., $-CO_2R$, where R is alkyl or substituted alkyl, as described herein for R'), carboxylic amide (e.g., $-CONH_2$, $-CONH(R)_2$, $-CON(R)_2$, where R is alkyl or substituted alkyl (e.g., 2-hydroxyethyl, 2-hydroxypropyl, allyl, benzyl, and the like), as described herein for R'), phenyl, sulfonic acid, and phosphonic acid.

In Formula (I), $R^2$ and $R^3$ each independently is a monovalent silyl group, $-Si(R^4)_3$, or $R^2$ and $R^3$ together are a divalent silylene group, $-Si(R^5)_2-$. Each $R^4$ and $R^5$ independently is selected from alkyl, phenyl, and alkoxy. For example, each $R^4$ and $R^5$ independently can be a $C_1$ to $C_4$ alkyl (e.g., methyl, ethyl, t-butyl), a phenyl, or a $C_1$ to $C_4$ alkoxy (e.g., $-OCH_3$, $-OCH_2CH_3$) group. In some embodiments each $R^4$ and $R^5$ is a methyl group (i.e., forming a trimethylsilyl group or a dimethylsilylene group). In other embodiments, each $R^4$ and $R^5$ independently can be different alkyl and/or alkoxy and/or phenyl, groups (e.g., where the silyl group is a t-butyl dimethyl silyl group, a phenyl dimethyl silyl group, and the like).

In some embodiments, the additive is a compound of Formula (II), which is a formula falling within the scope of Formula (I) (i.e., where $R^2$ and $R^3$ each are monovalent silyl groups):

in which $R^1$, $R^4$ and X are each as described herein with respect to Formula (I). One preferred compound of Formula (I) and Formula (II) is bis(trimethylsilyl) 2-fluoro-2-methylmalonate. Another preferred compound of Formula (I) and Formula (II) is bis(trimethylsilyl) 2-fluoro-2-allylmalonate.

In some other embodiments, the additive is a compound of Formula (III), which also is a formula falling within the scope of Formula (I) (i.e., where $R^2$ and $R^3$ together are a divalent silylene group):

(III)

in which $R^1$, $R^5$ and X are each as described herein with respect to Formula (I).

Methods of preparing 2,2-substituted malonate compounds are well known in the chemical arts. For example, the 2-position of a malonate ester can be deprotonated with a base, and the resulting anion can be reacted with a variety of electrophiles to introduce a 2-substituent. This process can be repeated to introduce a second substituent forming a 2,2-disubstituted malonate. In some cases, the introduced substituent can be converted to another substituent (e.g., reduction of cyano to aminomethyl, displacement of halogen by a nucleophile, oxidation of alkylthio to a sulfone, etc.). For example, an alkyl (e.g., methyl, ethyl, etc.) or 2-substituted alkyl (e.g., 2-hydroxyethyl, allyl, etc.) can be introduced by reacting a malonate-2-anion with an electrophilic alkyl or substituted-alkyl compound (e.g., an alkyl or substituted-alkyl halide, mesylate, etc.). Similarly, a halogen can be introduced reacting an electrophilic halogen source (e.g., an N-chlorosuccinimide, N-fluoro-o-benzenedisulfonimide (NFOBS), N-fluorobenzenesulfonimide (NFSI), etc.) with the 2-malonate anion. An alkoxy or cyano group can be introduced, for example, by nucleophilic displacement of a halogen, e.g., by an alkoxide or cyanide anion, respectively. A sulfonyl group can be introduced by nucleophilic displacement of a halogen, e.g., by a thiol anion, followed by oxidation of the resulting sulfide to a sulfone. Carboxyl, sulfonyl, and sulfonamide groups also can be introduced by reaction of a malonate-2-anion with an electrophilic carbonyl, alkylsulfonyl, or sulfonamido compound (e.g., a halide thereof), optionally utilizing a catalyst such as a heterocyclic base (e.g., an amidine base, imidazole), a transition metal-based catalyst (e.g., copper, zinc), and the like. Such reactions an reagents are well known in the chemical arts.

The additive (i.e., one or more compound of Formula (I), e.g., a compound of Formula (II), and/or Formula (III), can be present in the electrolyte at any concentration, but preferably is present at a concentration in the range of about 0.005M to about 0.5 M. In some embodiments, the additive is present in the electrolyte at a concentration in the range of about 0.01 M to about 0.4 M, or about 0.03 M to about 0.3 M.

The electrolyte can include any lithium salt that is suitable for use as a lithium ion source in electrolytes for lithium-ion batteries, which salts are well known in the secondary battery art. Preferably, the lithium salt is selected from one or more of $LiF_2BC_2O_4$, $LiPF_6$, $LiBF_4$, $LiB(C_2O_4)_2$, $LiClO_4$, lithium bis(fluorosulfonyl)imide (LiFSI), lithium bis(trifluoromethanesulfonyl)imide (LiTFSi), and $LiAsF_6$. The lithium salt can be present in the electrolyte at any concentration suitable for lithium-ion battery applications, which concentrations are well known in the secondary battery art. In some embodiments, the lithium salt is present in the electrolyte at a concentration in the range of about 0.1 M to about 3 M, e.g., about 0.5 M to 2 M, or 1 M to 1.5M.

The electrolyte comprises a non-aqueous solvent of claim 1, wherein the solvent comprises one or more solvent compound selected from a linear dialkyl carbonate (e.g., dimethyl carbonate (DMC), diethyl carbonate (DEC), ethyl methyl carbonate (EMC)), a cyclic alkylene carbonate (ethylene carbonate (EC), propylene carbonate (PC)), a sulfolane (e.g., sulfolane or an alkyl-substituted sulfolane), a sulfone (e.g., a dialkyl sulfone such as a methyl ethyl sulfone), a fluoro-substituted linear dialkyl carbonate, a fluoro-substituted cyclic alkylene carbonate, a fluoro-substituted sulfolane, and a fluoro-substituted sulfone. The solvent can comprise a single solvent compound or a mixture of two or more solvent compounds. In some embodiments, the solvent comprises a mixture of a cyclic alkylene carbonate and a linear dialkyl carbonate, for example, a mixture of ethylene carbonate and ethyl methyl carbonate (EC/EMC), e.g., in a weight to weight ratio of about 3:7 EC:EMC.

The electrolytes can be incorporated in a lithium ion electrochemical cell comprising a positive electrode (cathode), a negative electrode (anode), and a porous separator between the cathode and anode, with the electrolyte in contact with both the anode and cathode, as is well known in the battery art. A battery can be formed by electrically connecting two or more such electrochemical cells in series, parallel or a combination of series and parallel. The electrolyte can be utilized with any anode or cathode compositions useful in lithium-ion batteries. Electrochemical cell and battery designs and configurations, anode and cathode materials, as well as electrolyte salts, solvents and other battery components, are well known in the lithium battery art, e.g., as described in "Lithium Batteries Science and Technology" Gholam-Abbas Nazri and Gianfranco Pistoia, Eds., Springer Science+Business Media, LLC; New York, N.Y. (2009), which is incorporated herein by reference in its entirety.

In one embodiment, bis(trimethylsilyl) 2-fluoro-2-methylmalonate (BTMSFMM) is an electrolyte additive for high voltage (4.5 V or greater vs. Li/Li+) LIBs. The BTMSFMM additive was synthesized, purified, characterized and tested at Argonne National Laboratory. The structural features of the BTMSFMM additive include (i) a malonic ester core, (ii) fluorine and alkyl substituents on the alpha-carbon of the malonic ester core and (iii) two silyl groups esterifying the carboxylic acid groups of the core malonate. It is believed that silyl ester groups can react with HF generated in the electrolyte during charge and discharge of the lithium-ion cell, and thus mitigate the reaction of HF with the cathode surface. The electron withdrawing character of the fluorine atom on the malonate core provides a higher reduction potential, and the alkyl group on the core replaces the potentially acidic proton atom of the malonate to avoid parasitic reactions of the additive due to proton extraction.

The following non-limiting examples illustrate various features of the electrolytes and materials described herein, as well as methods of synthesizing such compounds.

GENERAL EXPERIMENTAL INFORMATION

All electrodes utilized herein are from the Argonne National Laboratory (ANL) Cell Analysis, Modeling and Prototyping (CAMP) facility.

The positive electrode material was composed of 90.0 wt % $Li_{1.03}(Ni_{0.5}Mn_{0.3}Co_{0.2})_{0.97}O_2$, 5.0 wt % poly(vinylidene difluoride) binder (PVdF; SOLVAY 5130) and 5.0 wt % carbon black (TIMCAL C45) coated on an aluminum current collector. The loading density of the positive electrode active material was 9.17 mg/cm².

The negative electrode was composed of 91.8 wt % graphite (CONOCOPHILLIPS A12), 6.0 wt % PVdF binder (KUREHA 9300), and 2.0 wt % carbon black (TIMCAL C45) coated on a copper current collector. The loading density of the negative electrode was 5.88 mg/cm².

The separator used in the coin cell assembly was a polypropylene/polyethylene/polypropylene separator (PP/PE/PP; CELGARD 2325). The "baseline" electrolyte used was composed of 1.2 M $LiPF_6$ in ethylene carbonate/ethyl methyl carbonate (EC/EMC) (3:7 w/w), without any additive of Formula (I).

All electrodes used were dried at 100° C. prior to use and all coin cells were assembled in an argon-atmosphere under constant-temperature (30° C.).

All electrochemical data were collected on MACCOR cyclers using 2032-type coin cells and the positive electrode, negative electrode and separator were 14, 15 and 16 mm in diameter, respectively.

Galvanostatic charge/discharge cycling was conducted between 3.0-4.4 V using the following outlined protocol: Five "formation" cycles at a C/10 rate were followed by "aging" cycles at a C/3 rate which include a 3 hour constant voltage hold at 4.4 V.

Hybrid pulse power characterization (HPPC) tests were performed periodically throughout the aging cycles from which area specific impedance (ASI) measurements were calculated.

Example 1

Synthesis of bis(trimethylsilyl) 2-fluoro-2-methylmalonate (BTMSFMM)

Preparation of diethyl 2-fluoro-2-methylmalonate (2): Sodium metal (2.3 g, 100 mmol) was carefully added to an oven-dried round bottom flask under Argon containing ethanol (110 mL) at room temperature and was allowed to fully dissolve, forming a sodium ethoxylate solution. Diethyl 2-fluoromalonate (1) (15.76 mL, 100 mmol) was added dropwise to the sodium ethoxylate solution over 15 minutes and the resulting solution was allowed to stir at room temperature for 30 minutes to deprotonate the 2-carbon of the 2-fluoro malonate. Methyl iodide (6.23 mL, 100 mmol) was then slowly added to the solution of deprotonated malonate. The reaction was then heated to reflux (about 80° C.) at which point the reaction mixture was stirred at reflux temperature for about 60 minutes. The reaction mixture was then allowed to cool, and ethanol (EtOH) was removed under reduced pressure. The resulting crude diethyl 2-fluoro-2-methylmalonate (2) was purified by vacuum distillation to yield pure (2) as a clear liquid (13.21 g, 68.8 mmol, 69%).

Preparation of 2-fluoro-2-methylmalonic acid (3): Diethyl 2-fluoro-2-methylmalonate (2) (13.21 g, 68.8 mmol) was added to a solution of sodium hydroxide (6.07 g, 151.8 mmol) in water (33.75 mL) and EtOH (162 mL) at about 60° C., and then and the reaction was allowed to stir for about 60 minutes. Upon cooling to room temperature, a white precipitate was collected and dried under reduced pressure for 12 hours. The white precipitate was then dissolved in dilute HCl (300 mL) and the solution was allowed to stir for 60 minutes at room temperature. The product was extracted from the acidic medium using diethyl ether (4×100 mL), the extracts dried over $Mg_2SO_4$ and concentrated under reduced pressure to yield pure (3) as a white solid (6.98 g, 51.3 mmol, 75%).

Preparation of bis(trimethylsilyl) 2-fluoro-2-methylmalonate (BTMSFMM): 2-Fluoro-2-methylmalonic acid (3; 4.51 g, 33.16 mmol) was added under an Argon atmosphere to an oven-dried round-bottom flask containing carbon tetrachloride (60 mL) and 1-(trimethylsilyl)-2-pyrrolidinone (10.61 mL, 69.6 mmol) and the resulting solution was refluxed (about 80° C.) for about 20 minutes. The following was then performed in a nitrogen glove bag: the solution was cooled to 0° C., a white precipitate was filtered off, and the carbon tetrachloride filtrate evaporated under reduced pressure. The crude product from the evaporated filtrate was purified by vacuum distillation to yield pure BTMSFMM as a clear oil (8.46 g, 30.15 mmol, 91%).

Example 2

The BTMSFMM additive was tested in a state-of-the-art electrolyte system (1.2 M $LiPF_6$ in a 3:7 (wt/wt) mixture of ethylene carbonate (EC) and ethylmethyl carbonate (EMC) (referred to herein as "EC/EMC (3/7, wt/wt)") in a full cell chemistry using $Li_{1.03}Ni_{0.5}Mn_{0.3}Co_{0.2}O_2$ (NMC532) as the positive electrode and graphite as the negative electrode.

Figure 1:
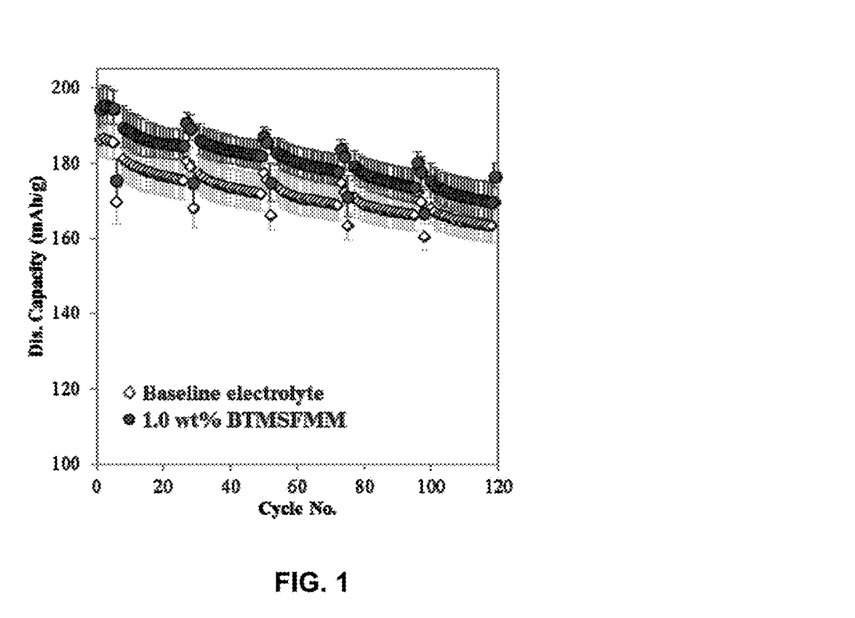
FIG. 1 shows discharge capacity vs. cycle number for NMC532/graphite full cells containing the baseline electrolyte with and without 1.0 wt % of a malonic silyl ester additive. The data show an average of 3-5 cells with error bars. The cells were cycled between 3.0-4.4 V at 30° C. The baseline electrolyte was composed of 1.2 M $LiPF_6$ in EC/EMC (3/7, wt/wt).

FIG. 1 shows the discharge capacity versus cycle number for the baseline electrolyte with and without 1.0 wt % of the BTMSFMM additive. Between three to five 2032-type coin cells were fabricated for both electrolyte systems and NMC532/graphite full cells were assembled and tested between 3.0-4.4 V at 30° C. The cycling protocol has three critical components: (i) 5 cycles at a "formation" C/10 rate; (ii) five-sets of 20 "aging" cycles at C/3 with a three hour constant-voltage hold at 4.4 V; and (iii) periodic hybrid pulse power characterization (HPPC) tests (at cycles 7, 30, 53, 76 and 99) from which area specific impedance (ASI) data are calculated. The cells containing the additive showed an average initial discharge capacity of 194.5 mAh/g (84.79% 1st cycle efficiency) while the baseline was slightly lower at 189.2 mAh/g (85.74% 1st cycle efficiency). The capacity retention for both electrolytes were similar with the baseline cells giving a 90.3% retention and the additive cells showing a 90.4% retention. Importantly, the cells containing the additive not only displayed a higher initial discharge capacity, but cycled on par with the baseline electrolyte.

Figure 2:
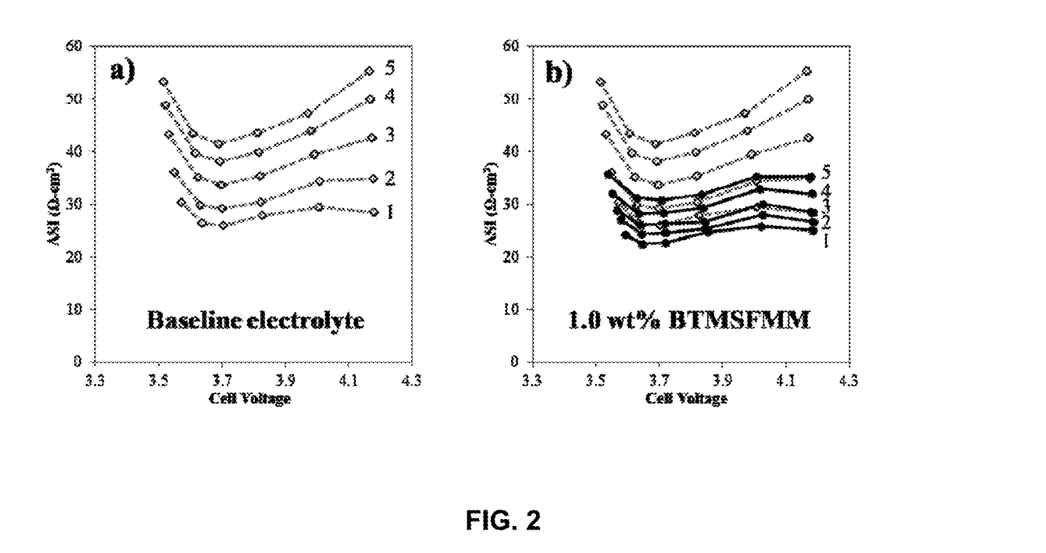
FIG. 2 shows area specific impedance values as a function of cycle and cell voltage obtained during cycling of NMC532/graphite full cells containing (a) the baseline electrolyte and (b) comparing baseline electrolyte and the elec- trolyte with 1.0 wt % of a malonic silyl ester additive. The cells were cycled between 3.0-4.4 V at 30° C. The baseline electrolyte was composed of 1.2 M $LiPF_6$ in EC/EMC (3/7, wt/wt). For plot (b), the baseline electrolyte values are in dashed lines and are the same as shown in plot (a). The numbers by individual data lines correspond to the HPPC test numbers as follows: "1" is at cycle 7, "2" is at cycle 30, "3" is at cycle 53, "4" is at cycle 76, and "5" is at cycle 99.

FIG. 2 compares the ASI values (calculated from the HPPC tests) between the cells using the baseline electrolyte with and without the BTMSFMM additive. Both plots show the ASI values as dots (with lines that connect them for visual aids) as a function of HPPC cycle number and cell voltage (state of charge). The impedance values in FIG. 2 are shown as lines (dashed lines for baseline electrolyte, solid lines for BTMSFMM additive) and each line is labeled with the HPPC test numbers 1-5 (HPPC-1 at cycle 7, HPPC-2 at cycle 30, HPPC-3 at cycle 53, HPPC-4 at cycle 76 and HPPC-5 at cycle 99). Panel (a) of FIG. 2 shows teats with baseline electrolyte only, while Panel (b) show the baseline values (dashed lines) overlaid with test values obtained with the electrolyte containing the BTMSFMM additive. All values referenced below refer to the ASI values at a cell voltage of about 3.7 V (or a state of charge of about 50). Both electrolyte systems show an increase in ASI for all cell voltages upon cycling. However, the addition of 1.0 wt % BTMSFMM into the baseline electrolyte decreased the initial (HPPC-1) ASI and decreased the overall rise in ASI (from HPPC-1 to HPPC-5) during cycling. The baseline electrolyte showed an initial ASI of 26.41 ohm-per-square centimeter ($\Omega/cm^2$) and a final ASI of 43.39 $\Omega/cm^2$, which affords an overall impedance rise of 16.98 $\Omega/cm^2$ (or 64.3%). In comparison, the BTMSFMM cell surprisingly showed an initial ASI of 22.46 $\Omega/cm^2$ and a final ASI of 31.19 $\Omega/cm^2$, affording an overall impedance rise of only 8.73 $\Omega/cm^2$ (or 38.9%). The decrease in impedance rise is significant and amounts to the additive showing a lower initial impedance, a lower final impedance rise and a lower overall impedance rise (by nearly 50%) compared to the baseline electrolyte.

The overall benefits observed when 1.0 wt % of the BTMSFMM additive was added to the baseline electrolyte are as follows:
   An improvement in initial discharge capacity (194.5 vs. 189.2 mAh/g) with similar 1st cycle efficiency.
   Similar capacity retention over the 120-cycle test protocol (90.4 vs. 90.3%).
   A reduction in initial (cycle 7) impedance (22.46 vs. 26.41 $\Omega/cm^2$).
   Significant reduction in overall impedance rise over course of cycling (38.9 vs. 64.3%).

Figure 3:
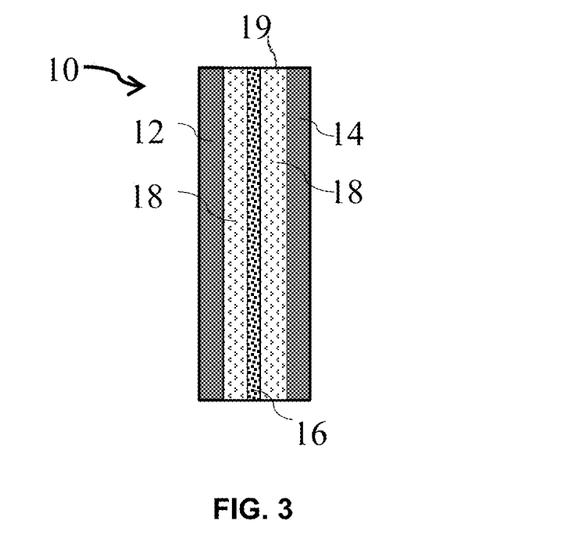
FIG. 3 schematically illustrates a lithium-ion electrochemical cell.
Figure 4:
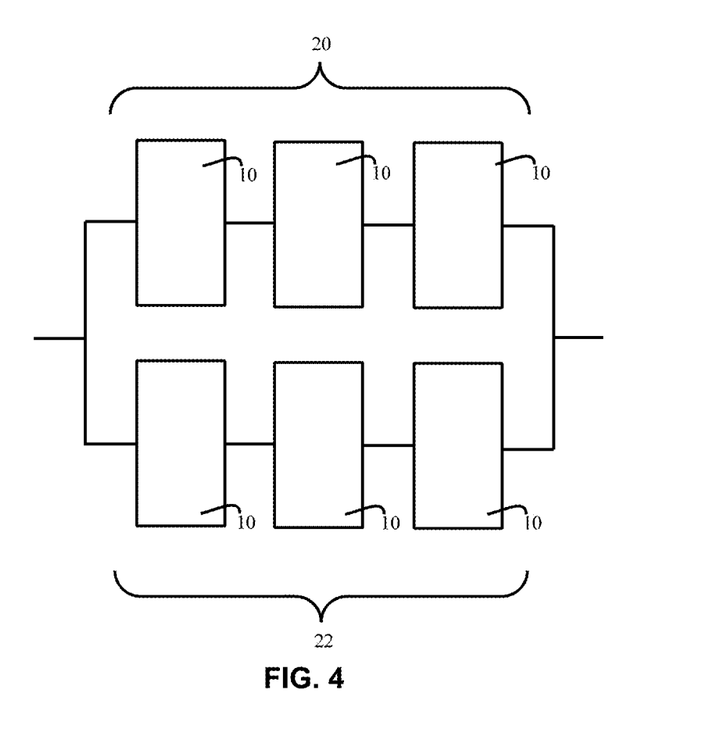
FIG. 4 schematically illustrates a lithium-ion battery.

FIG. 3 schematically illustrates a cross-sectional view of lithium-ion electrochemical cell 10 comprising cathode 12, and anode 14, with porous separator 16 therebetween. Electrolyte 18, comprising a solution of a lithium salt in a non-aqueous solvent containing an additive of Formula (I) (e.g., a compound of Formula (II) and/or (III)), contacts electrodes 12 and 14 and separator 16. The electrodes, separator and electrolyte are sealed within housing 19. FIG. 4 schematically illustrates a lithium-ion battery comprising a first bank 20 consisting of three series-connected electrochemical cells 10, and a second bank 22 consisting of three series-connected electrochemical cells 10, in which first bank 20 is electrically connected to second bank 22 in parallel.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Embodiments of the invention in which an exclusive property or privilege is claimed are defined as follows:

1. A non-aqueous electrolyte for a lithium-ion battery comprising a lithium salt and an additive in an organic solvent; wherein the solvent comprises one or more solvent selected from a linear dialkyl carbonate, a cyclic alkylene carbonate, a sulfolane, a sulfone, a fluoro-substituted linear dialkyl carbonate, a fluoro-substituted cyclic alkylene carbonate, a fluoro-substituted sulfolane, and a fluoro-substituted sulfone; and wherein the additive comprises a compound of Formula (I):

(I)

wherein:
R$^1$ is selected from alkyl and substituted-alkyl;
X is selected from halogen, alkoxy, cyano, sulfonyl, sulfonylamido, carboxylic acid, carboxylic ester, and carboxylic amide;
R$^2$ and R$^3$ each independently is Si(R$^4$)$_3$, or R$^2$ and R$^3$ together are Si(R$^5$)$_2$—;
each R$^4$ and R$^5$ independently is selected from alkyl, phenyl, and alkoxy; and
each substituted-alkyl comprises an alkyl moiety substituted with one or more substituent group selected from alkenyl, alkynyl, hydroxy, halogen, amino, alkoxy, carboxylic acid, carboxylic ester, carboxylic amide, phenyl, sulfonic acid, and phosphonic acid.

2. The electrolyte of claim 1, wherein the additive is present in the electrolyte at a concentration in the range of about 0.005 molar (M) to about 0.5 M.

3. The electrolyte of claim 1, wherein the lithium salt is present in the electrolyte at a concentration in the range of about 0.1 M to about 3 M.

4. The electrolyte of claim 1, wherein the lithium salt is selected from one or more of $LiF_2BC_2O_4$, $LiPF_6$, $LiBF_4$, $LiB(C_2O_4)_2$, $LiClO_4$, lithium bis(fluorosulfonyl)imide (LiFSI), lithium bis(trifluoromethanesulfonyl)imide (LiTFSi), and $LiAsF_6$.

5. The electrolyte of claim 1, wherein the solvent comprises a mixture of a linear dialkyl carbonate and a cyclic alkylene carbonate.

6. The electrolyte of claim 1, wherein X is F.

7. The electrolyte of claim 1, wherein $R^1$ is $C_1$ to $C_4$ alkyl.

8. The electrolyte of claim 1, wherein each $R^4$ and $R^5$ independently is a $C_1$ to $C_4$ alkyl group.

9. The electrolyte of claim 1, wherein the additive is a compound of Formula (II):

(II)

wherein:
$R^1$ is selected from alkyl and substituted-alkyl;
each substituted-alkyl comprises an alkyl moiety substituted with one or more substituent group selected from alkenyl, alkynyl, hydroxy, halogen, alkoxy, carboxylic acid, carboxylic ester, carboxylic amide, phenyl, sulfonic acid, and phosphonic acid;
X is selected from halogen, amino, alkoxy, cyano, sulfonyl, sulfonylamido, carboxylic acid, carboxylic ester, and carboxylic amide; and
each $R^4$ independently is selected from alkyl, phenyl, and alkoxy.

10. The electrolyte of claim 9, wherein X is F.

11. The electrolyte of claim 9, wherein $R^1$ is selected from $C_1$ to $C_4$ alkyl and allyl.

12. The electrolyte of claim 9, wherein each $R^4$ independently is a $C_1$ to $C_4$ alkyl group.

13. The electrolyte of claim 9, wherein X is F; and $R^1$ is selected from $C_1$ to $C_4$ alkyl and allyl.

14. The electrolyte of claim 9, wherein X is F; $R^1$ is selected from $C_1$ to $C_4$ alkyl and allyl; and each $R^4$ independently is a $C_1$ to $C_4$ alkyl group.

15. The electrolyte of claim 9, wherein X is F; $R^1$ is selected from methyl and allyl; and each $R^4$ is methyl.

16. The electrolyte of claim 1, wherein the additive is a compound of Formula (III)

wherein:
$R^1$ is selected from alkyl and substituted-alkyl;
each substituted-alkyl comprises an alkyl moiety substituted with one or more substituent group selected from alkenyl, alkynyl, hydroxy, halogen, amino, alkoxy, carboxylic acid, carboxylic ester, carboxylic amide, phenyl, sulfonic acid, and phosphonic acid;
X is selected from halogen and alkoxy; and
each $R^5$ independently is selected from alkyl, phenyl, and alkoxy.

17. The electrolyte of claim 16, wherein X is F.

18. The electrolyte of claim 16, wherein $R^1$ is selected from $C_1$ to $C_4$ alkyl and allyl.

19. The electrolyte of claim 16, wherein each $R^5$ independently is a $C_1$ to $C_4$ alkyl group.

20. The electrolyte of claim 19, wherein X is F; and $R^1$ is selected from methyl and allyl.

21. A lithium-ion electrochemical cell comprising a cathode and an anode, with porous separator therebetween, and an electrolyte of claim 1 contacting the anode, the cathode and the separator.

22. A lithium-ion battery comprising a plurality of electrochemical cells of claim 20 electrically connected in series, parallel, or both series and parallel.

* * * * *

UNITED STATES PATENT AND TRADEMARK OFFICE
CERTIFICATE OF CORRECTION

PATENT NO. : 10,461,364 B2  
APPLICATION NO. : 15/492260  
DATED : October 29, 2019  
INVENTOR(S) : Chen Liao et al.

Page 1 of 1

It is certified that error appears in the above-identified patent and that said Letters Patent is hereby corrected as shown below:

In the Claims

Claim 1, Column 12, Line 57, delete "Si($R^4$)$_3$" and insert -- –Si($R^4$)$_3$--.
   Line 58, delete "Si($R^5$)$_2$–" and insert -- –Si($R^5$)$_2$– --.

Claim 16, Column 14, Line 9, after the word "Formula" insert --III:--.

Signed and Sealed this
Twenty-eighth Day of April, 2020

Andrei Iancu
*Director of the United States Patent and Trademark Office*